(12) United States Patent
George et al.

(10) Patent No.: US 11,972,250 B2
(45) Date of Patent: Apr. 30, 2024

(54) OUT-OF-BAND FIRMWARE UPDATE

(71) Applicant: Hewlett Packard Enterprise Development LP, Houston, TX (US)

(72) Inventors: Aneesh George, Karnataka (IN); Mekhla Garg, Karnataka (IN); Sreejith Kumar Kurikal Veedu, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 63 days.

(21) Appl. No.: 17/659,188

(22) Filed: Apr. 14, 2022

(65) Prior Publication Data
US 2023/0229426 A1    Jul. 20, 2023

(30) Foreign Application Priority Data
Jan. 18, 2022   (IN) .............................. 202241002918

(51) Int. Cl.
  *G06F 8/654*   (2018.01)
  *G06F 8/61*    (2018.01)
  *G06F 9/4401*  (2018.01)

(52) U.S. Cl.
  CPC .............. *G06F 8/654* (2018.02); *G06F 8/63* (2013.01); *G06F 9/4401* (2013.01); *G06F 9/4416* (2013.01)

(58) Field of Classification Search
  CPC ........................... G06F 8/60–66; G06F 9/4401
  USPC .................................................. 717/168–178
  See application file for complete search history.

(56) References Cited

U.S. PATENT DOCUMENTS

| | | | |
|---|---|---|---|
| 9,274,824 B2 | 3/2016 | Blake et al. |
| 9,473,522 B1 | 10/2016 | Kotler et al. |
| 9,705,974 B2 | 7/2017 | Reddy et al. |
| 9,710,653 B2 | 7/2017 | Kotler et al. |

(Continued)

FOREIGN PATENT DOCUMENTS

WO   2016/172151 A1   10/2016

OTHER PUBLICATIONS

Cheng, Hui-Chin, et al., Out-of-Band Management on UEFI System Firmware, Technical Disclosure Commons, Feb. 22, 2018, 10 pages, [retrieved on Jan. 4, 2024], Retrieved from the Internet: <URL:https://www.tdcommons.org/dpubs_series/1066/>.*

(Continued)

*Primary Examiner* — Geoffrey R St Leger
(74) *Attorney, Agent, or Firm* — Hewlett Packard Enterprise Patent Department

(57) ABSTRACT

Examples of performing an out-of-band firmware update of a server computing device are described. In an example, a first disk image is mounted onto a server computing device. The first disk image comprises a bootable firmware and is mounted in response to a mount command received through an out-of-band communication service. In another example, a second disk image is also mounted onto the server computing device. The second disk image is also mounted in response to another mount command received through the out-of-band communication service and is to provide a read-writable container, when mounted. Thereafter, a booting process of the server computing device may be initiated based on mounted first image to update the firmware of the server computing device. Information related to the update of the firmware is store in the read-writable container.

14 Claims, 5 Drawing Sheets

(56) References Cited

U.S. PATENT DOCUMENTS

| | | | |
|---|---|---|---|
| 10,055,219 B1* | 8/2018 | Olderdissen | H04L 67/34 |
| 10,339,317 B2 | 7/2019 | Raghuram et al. | |
| 10,511,407 B2 | 12/2019 | Rathineswaran et al. | |
| 11,226,827 B2 | 1/2022 | Hsu et al. | |
| 2018/0173516 A1* | 6/2018 | Tung | G06F 8/654 |
| 2020/0210166 A1* | 7/2020 | Gore | G06F 8/63 |
| 2020/0249846 A1 | 8/2020 | Bhatia et al. | |
| 2020/0249999 A1 | 8/2020 | Golway et al. | |
| 2020/0301688 A1* | 9/2020 | Schiefelbein | G06F 8/61 |

OTHER PUBLICATIONS

How to mount an ISO image to the server via out-of-band Console?, Cherry Servers, 2020, 4 pages, [retrieved on Jan. 4, 2024], Retrieved from the Internet: <URL:https://web.archive.org/web/20200924232428/https://docs.cherryservers.com/knowledge/how-to-mount-iso-via-ip-kvm-step-by-step>.*

* cited by examiner

OUT-OF-BAND FIRMWARE UPDATE

BACKGROUND

Server infrastructure, comprising one or more server computing devices, may be used for implementing a variety of functions, such as data storage, emails, or hosting applications. The server computing devices within the server infrastructure may have to be monitored and managed to ensure that the server computing devices continue to operate in a performant manner.

BRIEF DESCRIPTION OF FIGURES

Systems and/or methods, in accordance with examples of the present subject matter are now described and with reference to the accompanying figures, in which.

DETAILED DESCRIPTION

Figure 1:
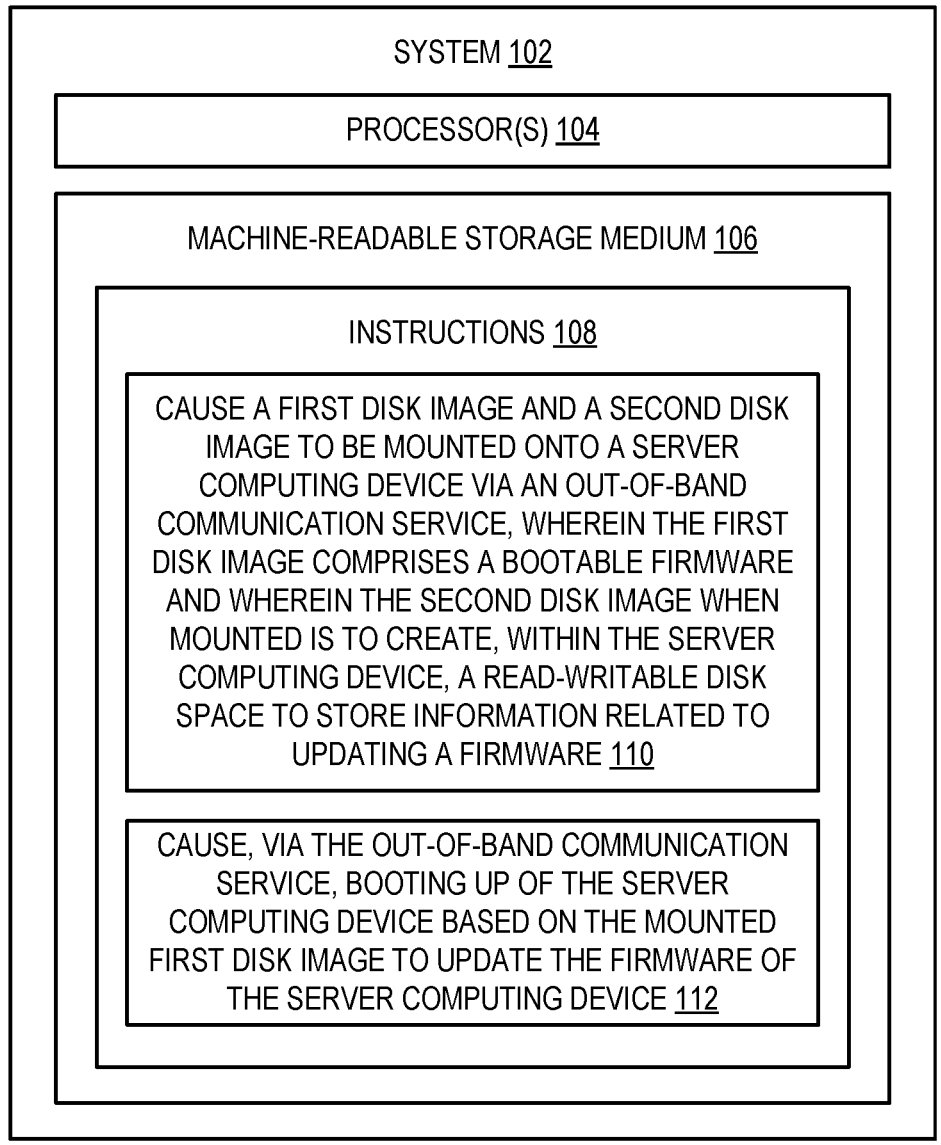
FIG. 1 illustrates a system for performing an out-of-band firmware update of a server computing device, as per an example.

Expansive server infrastructures, such as large data centres, may include a plurality of server computing devices. The server computing devices may implement a variety of functions and services. The server computing devices are continually managed and monitored to ensure that the services are available, and that they continue to operate in an efficient manner. Management of the server computing devices may involve performing a host of functions related to hardware components, software, security, and backups. For example, management may involve detecting and replacing faulty hardware, updating software, etc.

The management related functions are implemented through a computer-implemented management system. The management system may remotely monitor and manage a plurality of server computing devices. In case the server computing devices exhibits any issues, the management systems may generate and transmit control instructions to the server computing device. The control instructions may result in performing certain functions to rectify an issue any one or more server computing devices may be experiencing.

The server computing devices may be managed remotely, through either 'out-of-band' or 'in-band' techniques. 'In-band' may typically refer to features or functionalities that may be accessed, initiated, or implemented through an operating system of the server computing device. On the other hand, 'out-of-band' techniques may refer to features or functionalities which may be enabled or initiated through a management sub-network of the server computing device, without accessing the operating system of the server computing device. To this end, the server computing devices may be provided with a management controller which may be remotely accessed by the management system. The management system, through out-of-band communication, may communicate with and control the management controller. The management controller may then implement certain functions on the server computing devices. Out-of-band management functions and communication may be based on protocol or specification implementing out-of-band management server management. Examples of such protocols include, but are not limited to, Intelligent Platform Management Interface (IPMI) protocol, and the Redfish® specification.

Out-of-band management techniques for server computing device are preferred since such techniques can provide access of the server computing device even if the server computing device is turned off, is inaccessible, or if their operating system is down or unresponsive. Through out-of-band techniques any server computing device which has access to another management network may be controlled and managed.

Management of server computing devices may include maintenance of hardware, as well as software components of the server computing device. For example, in relation to software components, firmware of the server computing device may be continually updated. The firmware may include executable code for controlling or operating a computing device, such as the server computing device.

Updating the firmware may involve initiating in-band, i.e., through the installed operating system (OS) of the server computing device, the firmware update process. For example, the firmware update process may be initiated through an executable command entered through a command line interface available through the operating system. In some cases, in-band firmware update may not preferred owing to a number of factors. For example, in-band access depends on the server computing devices being in a powered-on state. Also, in-band access is possible through the operating system of the server computing device. If the operating system has crashed or is experiencing errors, in-band access may not be possible. Furthermore, in-band techniques cannot be used for accessing firmware.

For certain server computing devices, out-of-band updating of firmware, although possible, has to be manually initiated through commands entered on interfaces of the operating system. The firmware update process may encounter one or more errors during execution. In some cases, an update process may not include monitoring the firmware update. Such approaches may also not provide a mechanism for determining cause of errors that may have occurred during the firmware update process. Tracking, monitoring, and communicating information pertaining to a firmware update process which is underway, may involve modifying the system firmware of the server computing device, itself. This may not be possible for existing assets within a server infrastructure.

To address the foregoing technical challenges, examples described herein relate to approaches for updating a firmware of a server computing device. The firmware update process may be effected through a management controller implemented within the server computing device. In an example, the firmware update process may be performed using an out-of-band communication between the management controller and a remote management system. The management system, amongst other functions, is to implement remote management and monitoring functions for the server computing device. Out-of-band communication may refer to functions or features that may be implemented through messaging between two entities (which in the present instance include the server computing device and the remote management system).

In operation, the management system may cause a first disk image and a second disk image to be mounted onto a server computing device. The mounting of the first disk image and the second disk image is performed in response to an out-of-band mount command transmitted by the management system and received by the server computing device. The first disk image comprises a bootable firmware bundle based on which firmware of the server computing device is to be updated. The second disk image is a read-writable (i.e., capable of being read from and written to) disk image based on which a read-writable disk space may be provided within the server computing device, once the second disk image is mounted.

Once the first disk image and the second disk image are mounted, the server computing device may initiate a boot-up process based on the bootable firmware mounted on the server computing device. The boot-up process may result in the firmware of the server computing device to be updated. In an example, any information pertaining to the firmware update process may be obtained in the form of logs and written to the read-writable disk space. Once the firmware update process is complete, the second disk image may be unmounted from the server computing device. The unmounted second disk image, which now includes the logs written to the read-writable disk space, may be mounted on the management system and may thereafter be used for retrieving the logs. In an example, the management system may provide a status of the firmware update to the user.

The present examples enable out-of-band updating of the firmware of the server computing device through the management system. Furthermore, such approaches also allow information pertaining to the firmware update process to be retrieved based on which the firmware update process may be further analyzed in case any errors occurred during the firmware update process. The present examples may be performed without any user intervention and without involving any changes to be made to the firmware of the server computing device. These and other examples are further described in conjunction with the accompanying figures.

FIG. 1 illustrates an example system 102 for performing out-of-band firmware update of a server computing devices. The system 102 may be communicatively coupled to the server computing device and is to provide management and monitoring capabilities independently of the operating system and other components of the server computing device. Examples of the components of the server computing device include, hardware components (e.g., the central processing unit or the CPU), and software components (e.g., firmware or operating system). Although described with respect to a single server computing device, the described examples may also be implemented for multiple server computing devices which may be present within a server infrastructure.

The system 102 includes a processor 104, and a machine-readable storage medium 106 which is coupled to, and accessible by, the processor 104. The system 102 may be implemented in any computing system, such as a server, desktop or a laptop computing device, a distributed computing enabled system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. For example, the processor 104 may include a microcontroller, a microprocessor, a central processing unit (CPU), a graphics processing unit (GPU), a data processing unit (DPU), an application-specific integrated circuit (ASIC), a field programmable gate array (FPGA), a system-on-a-chip (SOC), etc. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instructions 108 may be executed to perform out-of-band firmware update of the server computing device.

In an example, as a result of the execution of instructions 108, the system 102 may initially generate and transmit a mount command to the server computing device. In an example, the mount command is transmitted through an out-of-band communication services. Out-of-band communication services may refer to functions or features that may be implemented through messaging between two entities (which in the present instance, include the server computing device and the remote management system). Such communication services may be provided over a management channel which enables the management system to manage and monitor the server computing devices. Out-of-band management functions and communication may be based on protocol or specification implementing out-of-band management server computing devices. Examples of such protocols include, but are not limited to, Intelligent Platform Management Interface (IPMI) protocol, and the Redfish® specification.

Returning to the present example, the instructions 110 may be executed to cause mounting a first disk image and a second disk image onto the server computing device. In an example, the first disk image may include bootable firmware based on which the firmware of the server computing device is to be updated. When mounted, the bootable firmware within the first disk image may be provided within a partition in the server computing device. The second disk image on the other hand, when mounted, provides a read-writable disk space within the partition of the server computing device. The read-writable disk space is to store information related to updating a firmware of the server computing device. The instructions 110 for mounting the first disk image and the second disk image may either be specifically defined by an infrastructure administrator or may be implemented as services provided under out-of-band management protocols. For example, a virtual media service (e.g., of a management controller of the server computing device) may be used for mounting the first disk image and the second disk image onto the server computing device.

In an example, the bootable firmware may be specified as a boot target for the server computing device. The bootable firmware in the first disk image may include updated operational or control instructions for the server computing device. Once the first disk image and the second disk image are mounted, instructions 112 may be executed to cause the server computing device to be booted based on the mounted first disk image. Since the first disk image comprises the bootable firmware, boot-up of the server computing device updates the firmware of the server computing device. Thereafter, the instructions 114 may be executed to store information related to the firmware update process in the read-writable disk space provided within the server computing device.

Figure 2:
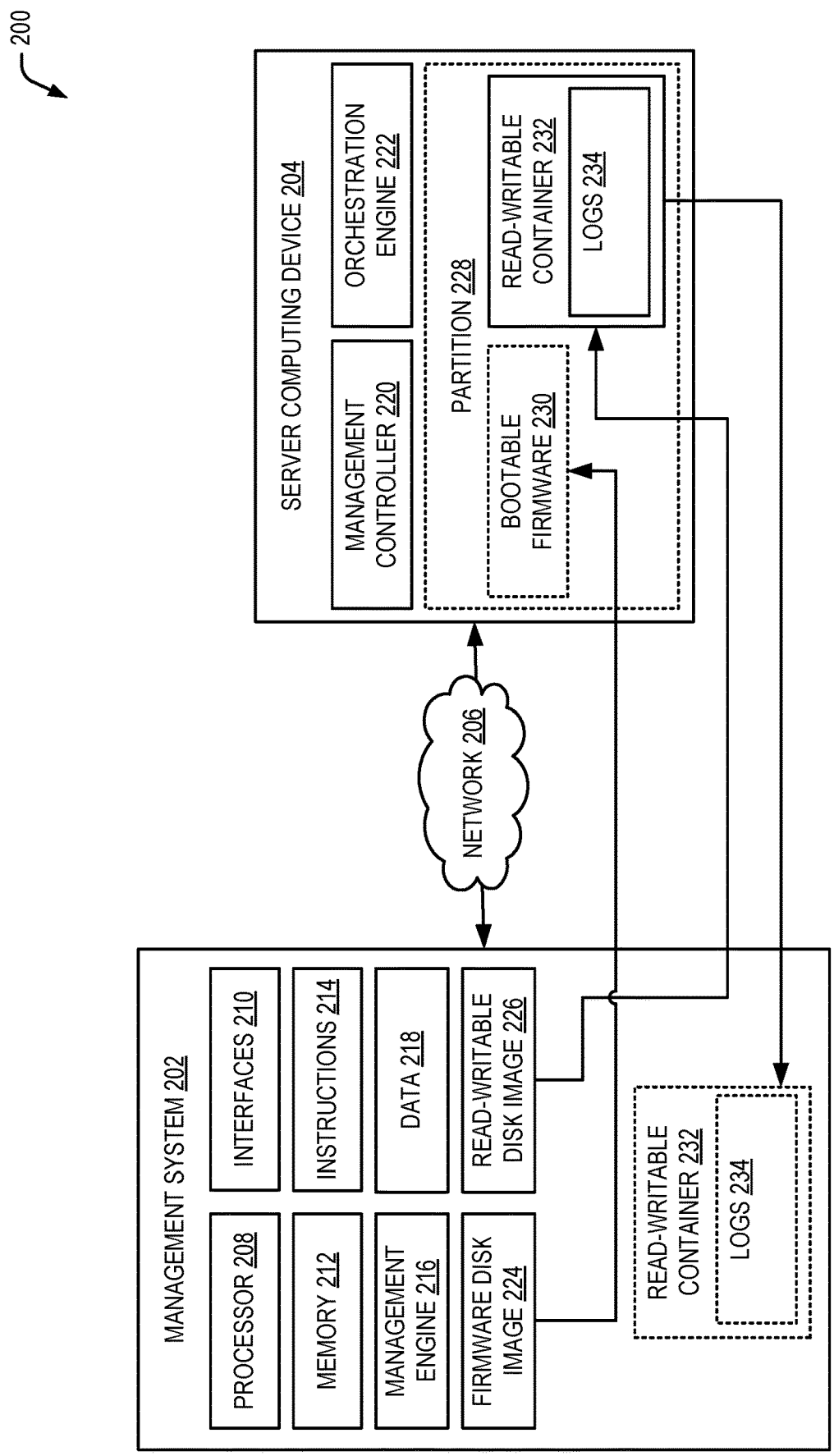
FIG. 2 illustrates an environment comprising a system for performing an out-of-band firmware update of a server computing device, as per an example.

FIG. 2 illustrates a computing environment 200 (also referred to herein as environment 200) comprising a management system 202 and a server computing device 204. The system 202 may be any computing system or a subsystem implementing one or more interface specifications or protocols, based on which the system 202 may perform out-of-band management of the server computing device 204 (also referred to herein as the server 204). Although a single server 204 is depicted, the environment 200 may include multiple server computing devices similar to the server 204, without limiting the present subject matter. The environment 200 may also refer to examples in which different elements of the environment 200 (e.g., the system 202 and the server 204) are locally situated within a data center. The environment 200 may also refer to examples in which such elements are geographically dispersed with one or more of its elements (e.g., the system 202, the server 204 or other server computing devices) being remote from other elements. Such different examples would still fall within the scope of the present subject matter.

The system 202 may communicate with the server 204 through a network 206. The network 206 may be a private network or a public network and may be implemented as a wired network, a wireless network, or a combination of a wired and wireless network. Amongst other functions, the network 206 functions as an out-of-band network to allow out-of-band communication between the system 202 and the server 204. In an example, the network 206 may provide an alternate secure and remote connection or a management channel between the system 202 and the server 204 during instances involving outages or disruptions to an otherwise operational communication channel through which the server 204 may be generally accessed.

The system 202 may further include a processor 208, interfaces 210, and memory 212. The processor 208 may be implemented as microprocessors, microcomputers, microcontrollers, digital signal processors, CPUs, state machines, logic circuitries, and/or other devices that manipulate signals or requests based on operational instructions. The interfaces 210 may allow the connection or coupling of the system 202 with either a single computing device or multiple computing devices, such the server 204, through a wired network, a wireless network, or a combination of a wired and wireless network. The interfaces 210 may also enable intercommunication between different logical as well as hardware components of the system 202. The term interfaces 210 here is illustrative and is not to be construed as being limited to a certain type of interfaces.

The memory 212 may be a computer-readable medium, examples of which include volatile memory (e.g., RAM, also referred to as the main memory), and/or non-volatile memory (e.g., erasable programmable read-only memory, i.e., EPROM, flash memory, etc.). The memory 212 may be an external memory, or internal memory, such as a flash drive, a compact disk drive, an external hard disk drive, or the like. The memory 212 may further store data which either may be utilized or generated during the operation of the system 202.

Similar to the system 102, the system 202 may include instructions 214. The system 202 may further include a management engine 216 and data 218. In an example, the instructions 214 are fetched from the memory 212 and executed by the processor 208 included within the system 202 to implement the management engine 216, which performs out-of-band management of the server 204, as further described. During such functions, the management engine 216 may either utilize or generate data 218 for performing such functions.

The server 204 may also include a processor, memory, interfaces, and instructions (not depicted in FIG. 2), similar to the components of the system 202. In an example, the server 204 may include a management controller 220. As will be explained further, server 204 may also implement an orchestration engine 222 during the out-of-band firmware update of the server 204. The manner in which the orchestration engine 222 is implemented on the server 204 will be discussed and explained later.

The management engine 216, the management controller 220, and the orchestration engine 222 (collectively referred to as engines) may be implemented as a combination of hardware and programming, for example, programmable instructions to implement a variety of functionalities. In further examples described herein, such combinations of hardware and programming may be implemented in several different ways. For example, the programming for the engines may be executable instructions, such as instructions 214. Such instructions may be stored on a non-transitory machine-readable storage medium which may be coupled either directly with the system 202 or indirectly (for example, through networked means). In an example, the engines, if implemented as a hardware component, may include a processing resource, for example, either a single processor or a combination of multiple processors, to execute such instructions. In other examples, the engines may be implemented as electronic circuitry.

The management controller 220 (hereinafter referred to as controller 220) enables out-of-band control of the server 204, as well as communication between the server 204 and a management application (e.g., management engine 216) on the system 202. The out-of-band communication may be based on any protocol or specification which supports out-of-band management of the server 204 by the system 202. Examples of such protocols include, but are not limited to, Intelligent Platform Management Interface (IPMI) protocol, and the Redfish® specification. The controller 220 may be a rack management controller in a server rack arrangement. In such a case, the server rack may house a plurality of server equipment. The rack management controller, in such an example, may gather operational information from the system board of such different equipment, and share the same with a management subsystem, such as the system 202. In certain cases, the rack management controller may communicate with baseboard management controllers provided on the different equipment. In another example, controller 220 may refer to, and include, one or more baseboard management controllers, or a combination of the rack management controller and the baseboard management controllers, without limiting the scope of the present subject matter.

The system 202 may further include firmware disk image 224 and a read-writable disk image 226. A disk image, in the context of computing, may be a computer processable file containing contents and structure of a volume, or of an entire data storage device (e.g., a hard disk drive, tape drive, floppy disk, optical disc, or USB flash drive).

The firmware disk image 224 may refer to a disk image of bootable firmware for the server 204. The term bootable firmware may refer to a copy of firmware that is natively present in the server 204. Such bootable firmware may be used for installing or reinstalling the firmware onto the server 204, for example, in instances of fresh installations. The term bootable firmware may also refer to an updated firmware which is to be installed on the server 204. Such updates may include incremental code which is to be deployed onto the server 204 or may refer to an amended or updated firmware which may be installed on the server 204. The bootable firmware may also include executable code which when executed may invoke or activate executable instances or tasks for effecting and monitoring the boot-up process. The read-writable disk image 226 is to provide a read-writable disk space or read-writable disk image file system within the server 204. In an example, the firmware disk image 224 and the read-writable disk image 226 may be provided by an infrastructure administrator. In another example, the read-writable disk image 226 may be created by the system 202.

In operation, the management engine 216 may determine whether any firmware update is to be performed for the server 204. Such a determination may be based on presence of a firmware disk image 224 within the system 202 or may be determined based on a command provided by the infrastructure administrator. Thereafter, the management engine 216 within the system 202 may initiate the firmware update process of the server 204.

For performing the firmware update process, the server 204 may be powered down. While in the powered down state, the management engine 216 may communicate with the controller 220 of the server 204 through out-of-band communication over the network 206 to initiate the firmware update process. In an example, the management engine 216 may generate and transmit to the controller 220, a mount command. The mount command when executed results in mounting the firmware disk image 224 and the read-writable disk image 226 onto a storage medium of the server 204. In an example, the firmware disk image 224 and the read-writable disk image 226 may be mounted onto a partition 228 within the server 204.

The mounting command may be processed by the controller 220, and the server 204 may make the bootable firmware available as bootable firmware 230 within the partition 228. Once available within the server 204, the controller 220 may set the bootable firmware 230 as a boot target for the server 204. Setting as a boot target enables initiating and performing the boot process based on the bootable firmware 230 as opposed to a native firmware which may be present within a memory of the server 204.

With respect to the read-writable disk image 226, the controller 220 may provide a read-writable container 232 (referred to as the container 232) within the partition 228. The read-writable container 232 may refer to a read-writable space corresponding to the read-writable disk image 226 within the partition 228, to which data may be written. In an example, the container 232 may be a read-writable file system, or a file within a file system onto which data may be written and stored. Once the bootable firmware 230 and the container 232 are available, the management engine 216 may transmit control instructions to the controller 220 to power on the server 204. As the server 204 is powered on, the bootable firmware 230 is detected as the boot target. The server 204 may then initiate the booting-up of the server 204 and the firmware update process based on the bootable firmware 230.

As described previously, the bootable firmware 230 may include updated firmware or incremental code which is to be installed on the server 204. The bootable firmware 230 may also include instructions which when executed may invoke or activate executable tasks for effecting and monitoring the boot-up process. In an example, orchestration engine 222 may be activated based on the bootable firmware 230. The orchestration engine 222 may monitor the firmware update process. It may be noted that the orchestration engine 222 may not be natively present on the server 204 but may be invoked to execute on the server 204 through the bootable firmware 230. Although originating from the bootable firmware 230, the orchestration engine 222 may be implemented through any other mechanisms without deviating from the scope of the present subject matter.

The orchestration engine 222 during the course of the firmware update process, may monitor and capture firmware update related information. For example, such information may indicate a list of drivers, files, or other software components, which may have been successfully loaded or otherwise implemented onto the server 204. Such information may also indicate components that may not have successfully loaded (or installed) or may include errors that may have occurred during the boot-up process. In an example, the orchestration engine 222 may record such updated related information as logs 234. The logs 234 in turn are stored within the read-writable container 232.

The orchestration engine 222 may continue to record the logs 234 in the container 232. Once the boot-up process is completed, the read-writable disk image 226 may be unmounted from the partition 228 of the server 204. At this stage, the read-writable disk image 226 includes the container 232 and the logs 234 stored therein. The orchestration engine 222 may then initiate the powering down of the server 204. The unmounted read-writable disk image 226 may then be retrieved by the system 202. Once retrieved, the read-writable disk image 226 may then be mounted by the system 202. Mounting the read-writable disk image 226 onto the system 202 makes the logs 234 available to the system 202. The logs 234 may thereafter be obtained by the system 202.

The information thus obtained from the logs 234 may be presented to an infrastructure administrator for reviewing. In response to the reviewing, the infrastructure administrator may determine whether the firmware update process completed successfully or whether any had errors occurred. The infrastructure administrator may, based on the information available in the logs 234 may also be in a position to ascertain causative factors that may have resulted in errors (if they occur) during the firmware update process. In an example, the logs 234 may be analyzed based on executable instructions or other external applications. Such instructions or other external applications may be present in the system 202 or may be present in other systems, without deviating from the scope of the present subject.

The above approaches enable performing the firmware update process without any intervention from the infrastructure administrator. Furthermore, the entire process may be performed through out-of-band management techniques. The described examples also implement mechanisms which can monitor the firmware update process and may also enable the infrastructure administrator to ascertain whether any issues occurred during the same.

Figure 3:
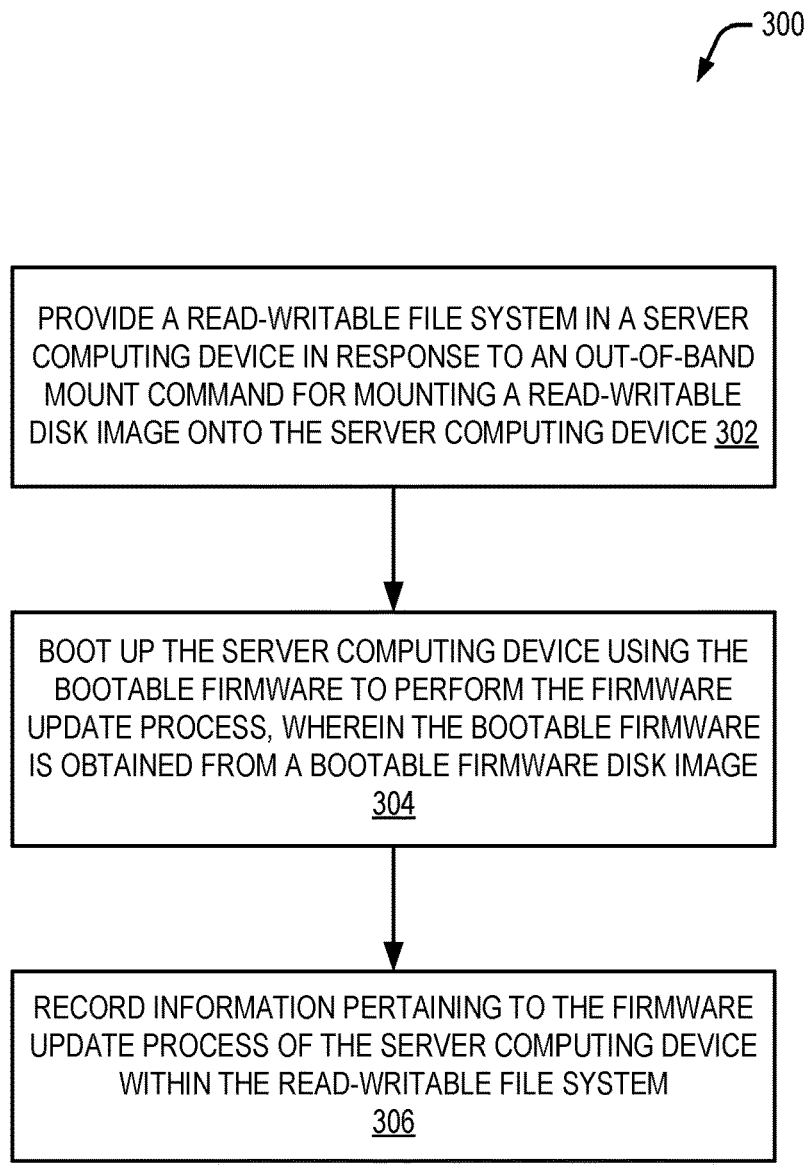
FIG. 3 illustrates a method for performing an out-of-band firmware update of a server computing device, as per an example.

FIG. 3 illustrates an example method 300 for performing an out-of-band firmware update of a server computing device, in accordance with examples of the present subject matter. The order in which the above-mentioned methods are described is not intended to be construed as a limitation, and some of the described method blocks may be combined in a different order to implement the methods, or alternative methods.

The above-mentioned methods may be implemented as hardware or a combination of hardware and programming. The steps of such methods may be performed by either a processor-based system under the instruction of machine executable instructions stored on a non-transitory computer readable medium or by dedicated hardware circuits, microcontrollers, or logic circuits. For example, the methods may be performed by a computing device, which may include the management system 202. In an example, the management system 202 may be communicatively coupled to a server computing device 204 through a network 206.

At block 302, a read-writable file system in a server computing device is provided to a server computing device in response to an out-of-band mount command for mounting a read-writable disk image onto the server computing device. For example, the system 202 may generate and transmit a mount command for mounting a firmware disk image 224 and a read-writable disk image 226 onto the server 204. The mount command may be processed by the controller 220 of the server 204 to provide a read-writable file system within a partition (such as the partition 228) on the server 204. The read-writable file system, in an example, may be the container 232. The container 232 provides a logical division on the partition 228 for storing data. The firmware disk image 224 may include bootable firmware which may be used for performing a firmware update process of the server 204. Once mounted, the bootable firmware is available as bootable firmware 230 in the server 204.

At block 304, the server computing device may be booted-up based on the bootable firmware to initiate a firmware update process. For example, the management engine 216 may transmit control instructions to the controller 220 to power on the server 204. Based on the received control instructions, the controller 220 may power on the server 204, and boot-up the server 204 based on the bootable firmware 230 and initiate the firmware update process of the server 204.

At block 306, information pertaining to the firmware update process is written to the read-writable file system. In an example, the initiation of the firmware update process may result in activating the orchestration engine 220 based on the bootable firmware 230. The orchestration engine 222, may monitor and capture update related information, which may include information pertaining to drivers, files, or other software components, which may have been successfully loaded or otherwise installed onto the server 204, during the firmware update process. In an example, the orchestration engine 222 may record such updated related information as logs 234. The logs 234 in turn may be stored within the read-writable container 232.

Figure 4:
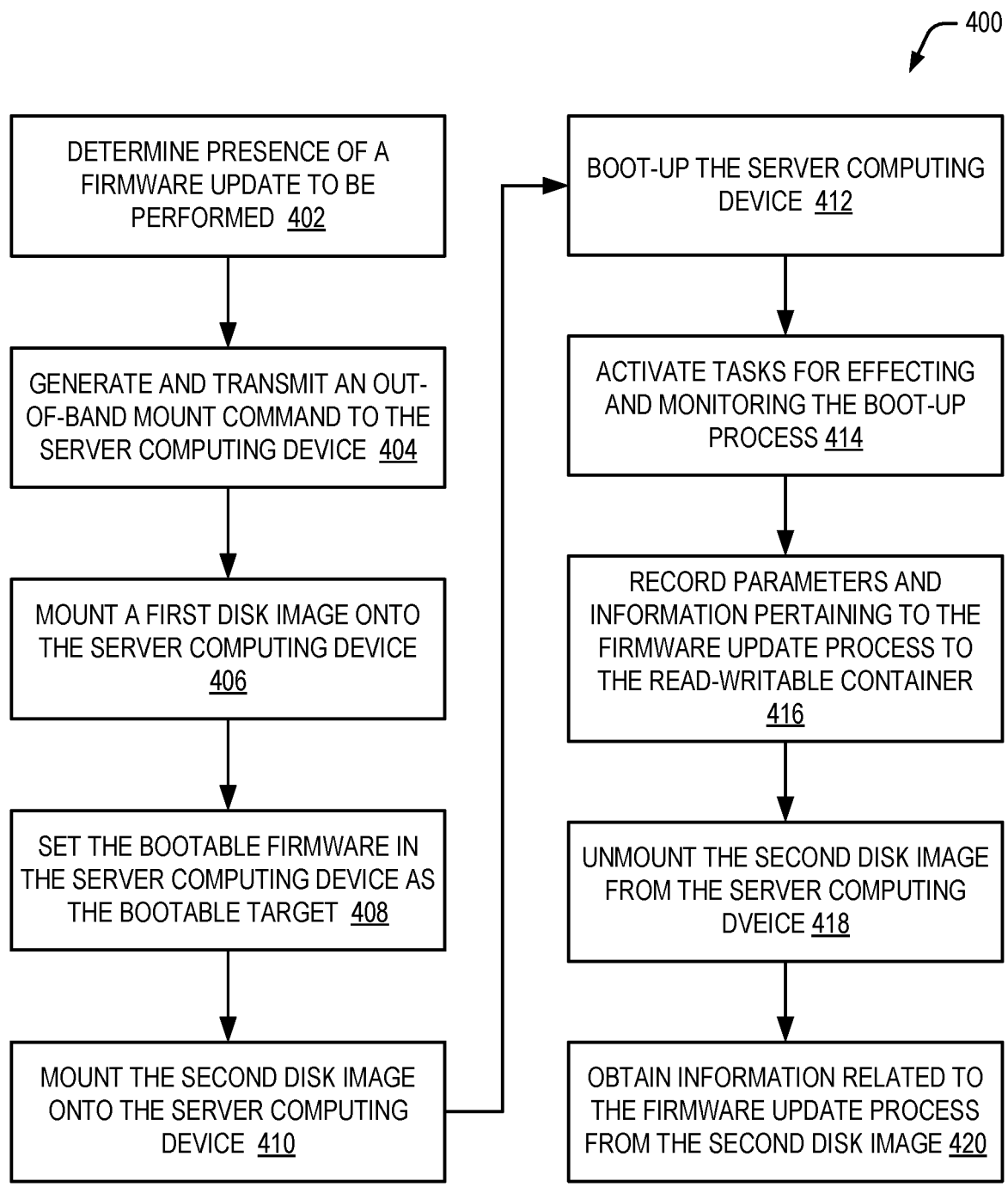
FIG. 4 illustrate a method for performing an out-of-band firmware update of a server computing device, as per another example.

FIG. 4 illustrates an example method 400 for performing an out-of-band firmware update of a server computing device, in accordance with examples of the present subject matter. The order in which the above-mentioned methods are described is not intended to be construed as a limitation, and some of the described method blocks may be combined in a different order to implement the methods, or alternative methods. The method 400 is further described in the context of the environment 200, which includes the management system 202, which may perform out-of-band management of the server 204.

At block 402, presence of a firmware update to be performed may be determined. For example, the management engine 216 of the system 202 may make such a determination based on availability of a firmware disk image 224 within the system 202 or based on a command provided by an infrastructure administrator. Based on the determination, the management engine 216 within the system 202 may initiate the firmware update process of the server 204. In an example, the server 204 may be powered down (i.e., switched off) in preparation for the firmware update process to be performed.

At block 404, an out-of-band mount command is generated and transmitted by the management system to the server computing device. For example, the management engine 216 may generate and transmit an out-of-band mount command to the server 204. The out-of-band mount command may be transmitted over the network 206 which provides an out-of-band management channel between the system 202 and the server 204. The network 206 may be used in instances involving outages or disruptions to an otherwise operational communication channel through which the server 204 may be accessed. In an example, the mount command is for mounting a firmware disk image 224 and a read-writable disk image 226 onto the server 204.

At block 406, the first disk image may be mounted. For example, in response to the mount command received from the management engine 216, the controller 220 may mount the firmware disk image 224 onto a partition 228 of the server 204. The firmware disk image 224 may include bootable firmware for the server 204. The term bootable firmware may refer to either firmware that is natively present in the server 204, or to an updated version of the firmware which is to be installed on the server 204. The updates may be in the form of incremental code which is to be deployed onto the server 204 or may refer to an amended or updated firmware which may be installed on the server 204. Once mounted, the bootable firmware may be made available as bootable firmware 230 in the partition 228.

At block 408, the bootable firmware in the server computing device is set as a bootable target. For example, the controller 220 may set the bootable firmware 230 as a boot target for the server 204. Setting as a boot target enables initiating the booting-up of the server 204 and performing the firmware update process based on the bootable firmware 230.

At block 410, the second disk image is mounted onto the server computing device. For example, the controller 220, in response to the mount command received from the management engine 216, may mount the read-writable disk image 226 onto the partition 228 of the server 204 to provide a container 232. The container 232 provides a read-writable space within the partition 228 in the form of a read-writable file system, or a file within a file system, onto which data may be written and stored.

At block 412, the server computing device may be booted up. In an example, the management engine 216 of the system 202 may generate and transmit control instructions to the controller 220 for powering on the server 204. Since the server 204 is in the powered down state, such instructions are transmitted out-of-band over the network 206. Based on the control instructions, the controller 220 may initiate powering on of the server 204. As the server 204 is powered on, it detects the bootable firmware 230 as the boot target and initiates the booting-up of the server 204 based on the bootable firmware 230. As the server 204 is booting-up, the firmware of the server 204 is updated based on the bootable firmware 230.

At block 414, tasks for effecting and monitoring the booting-up process may be activated during the boot-up process. For example, the bootable firmware 230 may also include instructions which when executed may invoke or activate executable tasks for effecting and monitoring the boot-up process. An example of such an executable task may be the orchestration engine 222. The orchestration engine 220 may be activated based on the bootable firmware 230. Once activated, the orchestration engine 222 may monitor the booting-up and the firmware update process of the server 204.

At block 416, information pertaining to the firmware update process are recorded to the read-writable container. In an example, the orchestration engine 220 monitors and captures update related information of the boot-up process of the server 204, initiated by the controller 220. Such information may indicate a list of drivers, files, or other software components, which may have been successfully loaded or otherwise implemented onto the server 204, during the boot-up process. The information may also indicate components that may not have successfully loaded (or installed) or may include errors that may have occurred during the boot-up process. In an example, the orchestration engine 222 may record such updated related information as logs 234. Once recorded, the orchestration engine 220 may write the logs 234 to the read-writable container 232.

At block 418, the second disk image may be unmounted. For example, the controller 220 may unmount the read-writable disk image 226, which includes the container 232, from the partition 228 of the server 204. In an example, the read-writable disk image 226 may be unmounted on determining that the boot-up process has completed. Once the read-writable disk image 226 is unmounted, the orchestration engine 222 may initiate the powering down of the server 204.

At block 420, the firmware update related information is obtained by the management system. For example, the management engine 216 may retrieve the read-writable disk image 226 once the boot-up process has completed. The management engine 216 may thereafter mount the read-writable disk image 226 (which had been unmounted from the server 204) onto the system 202, and retrieve the logs 234 that had been recorded onto the container 232. In an example, the retrieved information obtained from the logs 234 may be presented to the infrastructure administrator or any other user for reviewing and further analysis. For example, the infrastructure administrator may analyze the information retrieved from the logs 234 and determine whether the firmware update process completed successfully or whether any errors had occurred. The infrastructure administrator may ascertain causative factors that may have resulted in errors (if they occur) during the firmware update process. In an example, the logs 234 may be analyzed based on executable instructions or other external applications.

Figure 5:
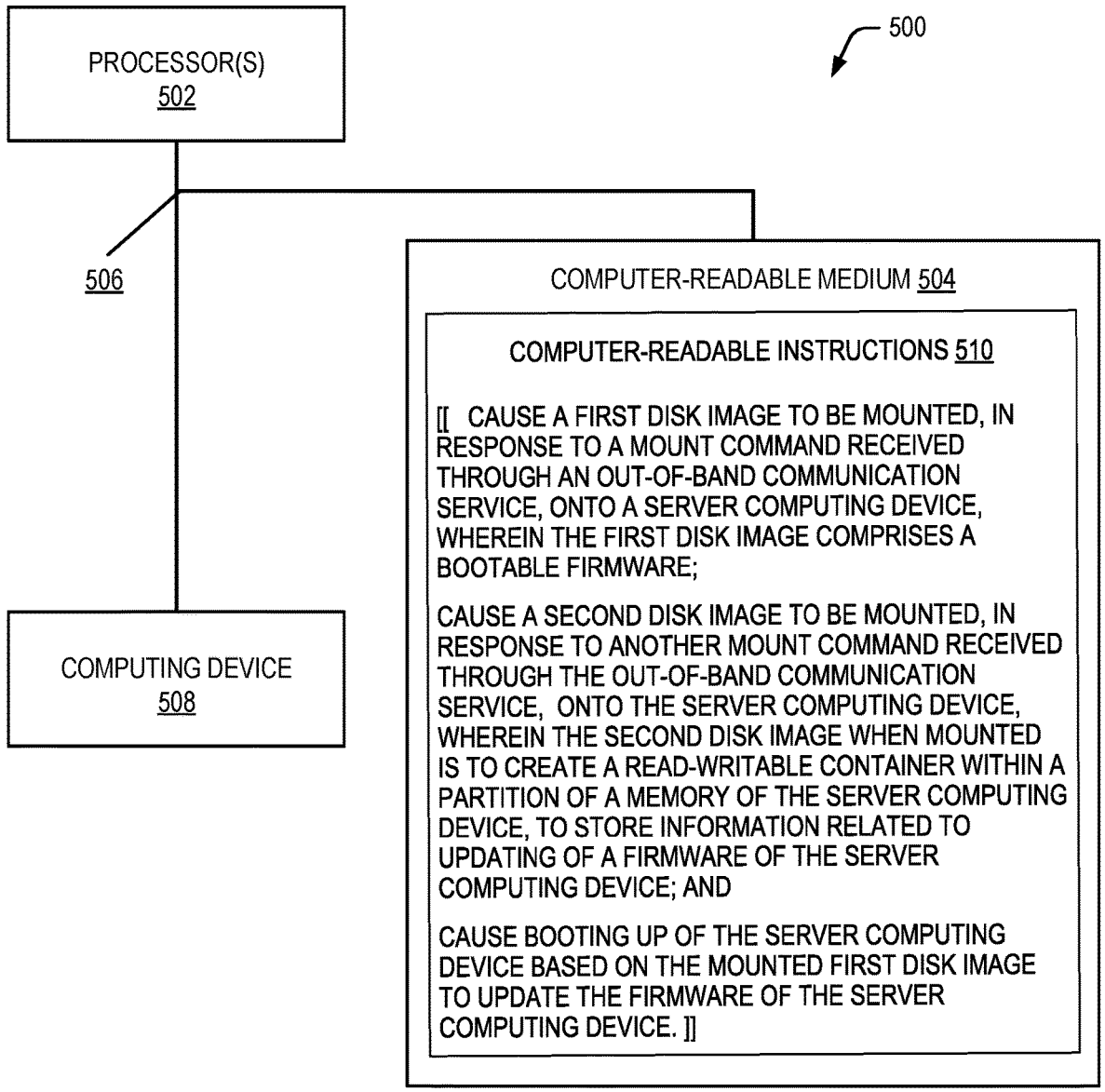
FIG. 5 illustrates a system environment implementing a non-transitory computer readable medium for performing an out-of-band firmware update of a server computing device, as per an example.

FIG. 5 illustrates a computing environment 500 implementing a non-transitory computer readable medium for managing data objects of different sizes within a distributed file system, as per an example. In an example, the computing environment 500 includes processor(s) 502 communicatively coupled to a non-transitory computer readable medium 504 through a communication link 506. In an example implementation, the computing environment 500 may be or serve as, for example, the system 102 or the object gateway 202. In an example, the processor(s) 502 may have a single processing resource or multiple processing resources for fetching and executing computer-readable instructions from the non-transitory computer readable medium 504. The processor(s) 502 and the non-transitory computer readable medium 504 may be implemented, for example, in system 102 or the system 202 (as has been described in conjunction with the preceding figures).

The processor(s) 502 may include a microcontroller, a microprocessor, a CPU, an ASIC, an FPGA, an SOC, and/or other hardware device suitable for retrieval and/or execution of instructions from the non-transitory computer readable medium 504 to perform functions related to various examples. Additionally, or alternatively, the processor(s) may include or be coupled to electronic circuitry or dedicated logic for performing some or all of the functionality of the instructions described herein.

The non-transitory computer readable medium 504 may be, for example, an internal memory device or an external memory device, such as RAM, ROM, EEPROM, flash memory, a hard disk drive, an optical disc, or the like. The computer readable medium 504 may be disposed within a computer system, in which case the executable instructions may be deemed installed or embedded on the computer system. Alternatively, the computer readable medium 504 may be a portable (e.g., external) storage medium, and may be part of an installation package. In an example implementation, the communication link 506 may be a network communication link. The processor(s) 502 and the non-transitory computer readable medium 504 may also be communicatively coupled to a computing device 508 over the network.

In an example implementation, the non-transitory computer readable medium 504 includes a set of computer readable instructions 510 (referred to as instructions 510) which may be accessed by the processor(s) 502 through the communication link 506. The computer readable instructions 500 may be useful for implementing the object engine 216 that interacts with the distributed file system 204.

Referring to FIG. 5, in an example, the non-transitory computer readable medium 504 includes instructions 510 that when executed may cause a first disk image to be mounted onto a server computing device in response to a mount command. The mount command may be received through an out-of-band communication service. The first disk image comprises a bootable firmware which may be used for updating the firmware of the server computing device. In an example, the instructions 510 may cause the controller 220 to mount the firmware disk image 224 onto the server 204. The mounting of the firmware disk image 224 is performed in response to an out-of-band mount command received from the management engine 216 of the system 202. Once the firmware disk image 224 is mounted, the bootable firmware 230 include therein, is made available in a partition 228 of the server 204.

The instructions 510 may be further executed to cause a second disk image to be mounted onto the server computing device, in response to another mount command received through the out-of-band communication service. The second disk image is such, that when mounted, is to provide a read-writable container within a partition of a memory of the server computing device. In an example, the read-writable container is to store information related to updating a firmware of the server computing device. For example, the management engine 216 may generate and transmit to the controller 220, a mount command. The mount command when executed results in mounting the firmware disk image 224 and the read-writable disk image 226 onto a storage medium of the server 204. In an example, the firmware disk image 224 and the read-writable disk image 226 may be mounted onto a partition 228 within the server 204. Once mounted, the server 204 may make the bootable firmware available as bootable firmware 230 within the partition 228. With respect to the read-writable disk image 226, the controller 220 may provide a read-writable container 232 (referred to as the container 232) within the partition 228.

The instructions 510 may then be executed to initiate a boot-up and performing a firmware update of the server computing device based on the bootable firmware included in the first disk image. For example, the instructions 510 may cause the controller 220 to boot-up and update the firmware of the server 204 based on the bootable firmware 230. Once the boot-up process is complete, the firmware of the server 204 is accordingly updated. In an example, the instructions 510 may cause information related to the update of firmware to be written to a read-writable container within the server computing device. For example, the orchestration engine 222 during the course of the firmware update process, may record firmware update related information as logs 234 in the container 232. Such information, in an example, may indicate a list of drivers, files, or other software components, which may have been successfully loaded or otherwise implemented onto the server 204. In another example, update related information may also indicate components that may not have successfully loaded or installed, or may include errors that may have occurred during the boot-up process. Such information may be retrieved by the system 202 for further analysis.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

The invention claimed is:

1. A system comprising:
a processor; and
a machine-readable storage medium comprising instructions executable by the processor to:
cause a first disk image and a second disk image to be mounted onto a server computing device via an out-of-band communication service, wherein the first disk image comprises a bootable firmware and wherein the second disk image when mounted is to create, within the server computing device, a read-writable disk space to store information related to updating a firmware of the server computing device; and
cause, via the out-of-band communication service, booting up of the server computing device based on the mounted first disk image to update the firmware of the server computing device;
activate an executable task present within the bootable firmware in response to booting up of the server computing device;
wherein the executable task is to record the information related to the update of the firmware in the read-writable disk space of the server computing device;
determine whether update of the firmware has completed; and
upon detecting completion of the update of the firmware, cause the second disk image to be unmounted from the server computing device.

2. The system of claim 1, wherein the out-of-band communication service is based on an out-of-band management protocol supported by the server computing device.

3. The system of claim 1, wherein the bootable firmware comprises an updated firmware to be installed on the server computing device.

4. The system of claim 1, wherein the instructions are executable by the processor to:

store the bootable firmware in the server computing device upon mounting the first disk image;
set the bootable firmware stored in the server computing device as a bootable target; and
power on the server computing device to initiate the booting up based on the bootable firmware set as the bootable target.

5. The system of claim 1, wherein the executable task, when activated, further includes to monitor the update of the firmware of the server computing device.

6. The system of claim 1, wherein the instructions are executable by the processor to:
mount the second disk image that has been unmounted from the server computing device upon detecting completion of the update; and
obtain information related to the update of the firmware stored in the further mounted second disk image.

7. The system as claimed in claim 1, wherein the read-writable disk space is a read-writable file system within the server computing device.

8. A method comprising:
provide a read-writable file system in a server computing device in response to an out-of-band mount command for mounting a read-writable disk image onto the server computing device;
booting up the server computing device using a bootable firmware to perform a firmware update process, wherein the bootable firmware is obtained from a bootable firmware disk image;
writing information pertaining to the firmware update process of the server computing device to the read-writable file system;
determining whether the firmware update process has completed; and
unmounting the read-writable disk image from the server computing device on detecting completion of the firmware update process.

9. The method of claim 8, wherein the bootable firmware disk image is mounted in response to the out-of-band mount command.

10. The method of claim 8, wherein the out-of-band mount command is received through an out-of-band communication service based on an out-of-band management protocol supported by the server computing device.

11. The method of claim 8, wherein the firmware update process of the server computing device comprises:
storing the bootable firmware in the server computing device upon mounting the bootable firmware disk image;
setting the bootable firmware stored in the server computing device as a bootable target; and
initiating the booting-up of the server computing device to perform the firmware update process based on the bootable firmware.

12. The method of claim 8, wherein the unmounting is performed in response to an unmount command received by the server computing device from a management system, wherein the management system is to perform out-of-band management of the server computing device.

13. A non-transitory computer-readable medium comprising computer-readable instructions that, when executed by a processor, are to:
cause a first disk image to be mounted, in response to a mount command received through an out-of-band communication service, onto a server computing device, wherein the first disk image comprises a bootable firmware;

cause a second disk image to be mounted, in response to another mount command received through the out-of-band communication service, onto the server computing device, wherein the second disk image when mounted is to create a read-writable container, within a partition of a memory of the server computing device, to store information, related to updating a firmware of the server computing device;

cause booting up of the server computing device based on the mounted first disk image to update the firmware of the server computing device;

cause an executable task present within the bootable firmware to be activated in response to booting up of the server computing device, wherein the executable task when activated is to record information related to update of the firmware in the read-writable container;

cause the second disk image to be unmounted from the server computing device, wherein the second disk image stores information related to the update of the firmware of the server computing device;

mount the second disk image that has been unmounted from the server computing device, upon detecting completion of the update, onto a management system communicatively coupled to the server computing device; and retrieve the information related to the update of the firmware from the read-writable container mounted onto the management system.

14. The non-transitory computer-readable medium of claim 13, wherein the read-writable container is a read-writable space, a read-writable file, or a read-writable file system within the partition of the memory of the server computing device.

* * * * *